US011652304B2

United States Patent
Parnoutsoukian et al.

(10) Patent No.: US 11,652,304 B2
(45) Date of Patent: May 16, 2023

(54) GROUNDING BLOCK AND GROUNDING METHOD FOR ELECTRIFIED VEHICLE TRACTION BATTERY

(71) Applicant: Ford Global Technologies, LLC, Dearborn, MI (US)

(72) Inventors: Hagop Parnoutsoukian, Lincoln Park, MI (US); Benjamin Marc Echterling, Detroit, MI (US); Robert Francis Eastman, III, Royal Oak, MI (US); Bradley Arnold Lammers, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 17/030,580

(22) Filed: Sep. 24, 2020

(65) Prior Publication Data

US 2022/0094082 A1 Mar. 24, 2022

(51) Int. Cl.
*H01R 4/64* (2006.01)
*H01R 4/02* (2006.01)

(52) U.S. Cl.
CPC .............. *H01R 4/64* (2013.01); *H01R 4/029* (2013.01); *H01R 2201/26* (2013.01)

(58) Field of Classification Search
CPC .............. H01R 4/56; H01R 4/64; H01R 4/66; H01R 4/029; H01R 4/06; H01R 4/186; H01R 4/187; H01R 2201/26

See application file for complete search history.

(56) References Cited

U.S. PATENT DOCUMENTS

| | | | |
|---|---|---|---|
| 4,057,310 A | * | 11/1977 | Young ..................... B60D 1/62 |
| | | | 439/35 |
| 6,250,975 B1 | | 6/2001 | LaPointe |
| 6,357,110 B1 | * | 3/2002 | Shipp ....................... H01R 4/34 |
| | | | 29/432.2 |
| 6,527,598 B1 | * | 3/2003 | Opel ..................... H01R 9/2408 |
| | | | 439/709 |
| 6,599,137 B2 | * | 7/2003 | Modina ................. H01R 4/305 |
| | | | 439/459 |
| 9,502,792 B2 | | 11/2016 | Kim et al. |
| 9,818,502 B1 | | 11/2017 | Petrucci et al. |
| 2015/0087168 A1 | * | 3/2015 | Saje .......................... H01R 4/66 |
| | | | 439/97 |
| 2019/0267728 A1 | * | 8/2019 | Mathews ................. H01R 4/64 |
| 2022/0140504 A1 | * | 5/2022 | Reed ..................... B60R 16/0215 |
| | | | 439/750 |

FOREIGN PATENT DOCUMENTS

| CN | 210272702 | * | 4/2020 | ............. H01R 11/12 |
|---|---|---|---|---|
| DE | 202015100319 U1 | | 3/2015 | |
| KR | 20150052560 A | | 5/2015 | |

* cited by examiner

*Primary Examiner* — Truc T Nguyen
(74) *Attorney, Agent, or Firm* — Vichit Chea; Carlson, Gaskey & Olds, P.C.

(57) ABSTRACT

An electrified vehicle assembly includes, among other things, a grounding block secured to a frame member of an electrified vehicle. The grounding block includes a bore configured to receive a fastener to hold a grounding strap connector relative to the grounding block.

14 Claims, 6 Drawing Sheets

GROUNDING BLOCK AND GROUNDING METHOD FOR ELECTRIFIED VEHICLE TRACTION BATTERY

TECHNICAL FIELD

This disclosure relates generally to grounding a traction battery of an electrified vehicle and, more particularly, to a grounding block to facilitate such grounding.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. A traction battery of an electrified vehicle can include a plurality of battery cell assemblies arranged in one or more battery arrays with an enclosure.

The traction battery can be required to maintain a ground path for the life of the vehicle. With reference to prior art FIGS. 6A and 6B, a prior art vehicle frame 2 includes a punched-in aperture 3. A mechanical fastener 4 that is received within the aperture 3 holds a grounding line 6 against the vehicle frame 2. The grounding line 6 grounds a traction battery 7 to the vehicle frame 2.

SUMMARY

An electrified vehicle assembly according to an exemplary aspect of the present disclosure includes, among other things, a grounding block secured to a frame member of an electrified vehicle. The grounding block includes a bore configured to receive a fastener to hold a grounding strap connector relative to the grounding block.

In another example of the foregoing assembly, the bore is unthreaded prior to receiving the fastener. The fastener is a thread-cutting fastener.

In another example of any of the foregoing assemblies, the grounding block is secured to an unapertured area of the frame member such that the grounding block spans over no aperture within the frame member.

In another example of any of the foregoing assemblies, the frame member has a hollow cross section, at least one internal surface that faces the hollow cross section, and at least one external surface that faces away from the hollow cross-section. The grounding block is secured to an external surface of the frame member.

Another example of any of the foregoing assemblies includes the grounding strap connector and the fastener. The grounding strap connector is held directly against the grounding block by the fastener.

Another example of any of the foregoing assemblies includes a locating system that locates the grounding strap connector relative to the grounding block.

In another example of any of the foregoing assemblies, the bore is disposed along an axis. The locating system is configured to locate the grounding strap circumferentially about the axis relative to the grounding block.

In another example of any of the foregoing assemblies, the bore is disposed along an axis. The locating system includes an aperture that receives a tang. The tang is at least partially received within the aperture to limit circumferential movement of the grounding strap connector relative to the grounding block.

In another example of any of the foregoing assemblies, the aperture is provided within the grounding block. The tang is part of the grounding strap connector.

In another example of any of the foregoing assemblies, the grounding block extends from a first side that contacts the vehicle frame to an opposite second side that is placed against the grounding strap connector. An area of the first side is greater than an area of the second side.

Another example of any of the foregoing assemblies includes a radially extending flange of the grounding block. The radially extending flange is near the vehicle frame. Radially is with reference to a longitudinal axis of the bore.

In another example of any of the foregoing assemblies, the grounding strap connector is configured to provide a ground path to the vehicle frame. The ground path is to ground a traction battery to the vehicle frame.

In another example of any of the foregoing assemblies, the fastener holds the grounding strap connector in direct contact with the grounding block.

A traction battery grounding method according to another exemplary aspect of the present disclosure includes, among other things, securing a grounding block to a frame member of an electrified vehicle, and receiving a fastener within a bore of the grounding block. The fastener holds a grounding strap connector relative to the grounding block.

Another example of the foregoing method includes, when positioning the fastener within the bore, cutting threads within the grounding block.

In another example of any of the foregoing methods, the grounding block is secured to unapertured area of the frame member such that the grounding block spans over no aperture within the frame member.

Another example of any of the foregoing methods includes circumferentially locating the grounding strap relative to the grounding block during the securing.

Another example of any of the foregoing methods includes receiving a tang within an aperture as part of a locating system during the locating.

In another example of any of the foregoing methods, the locating system circumferentially locates the grounding strap connector relative to the grounding block. Circumferential is with reference to an axis of the bore within the grounding block.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a grounding block that is used to ground a traction battery of an electrified vehicle.

The grounding block is secured to a frame member of the electrified vehicle. A grounding strap is secured to the grounding block to establish a ground path between the traction battery and the frame member. The grounding block can threadably engage with the mechanical fastener when the grounding strap is secured. The grounding block provides adequate areas for threaded engagement, which can facilitate a robust connection of the grounding strap.

Figure 1:
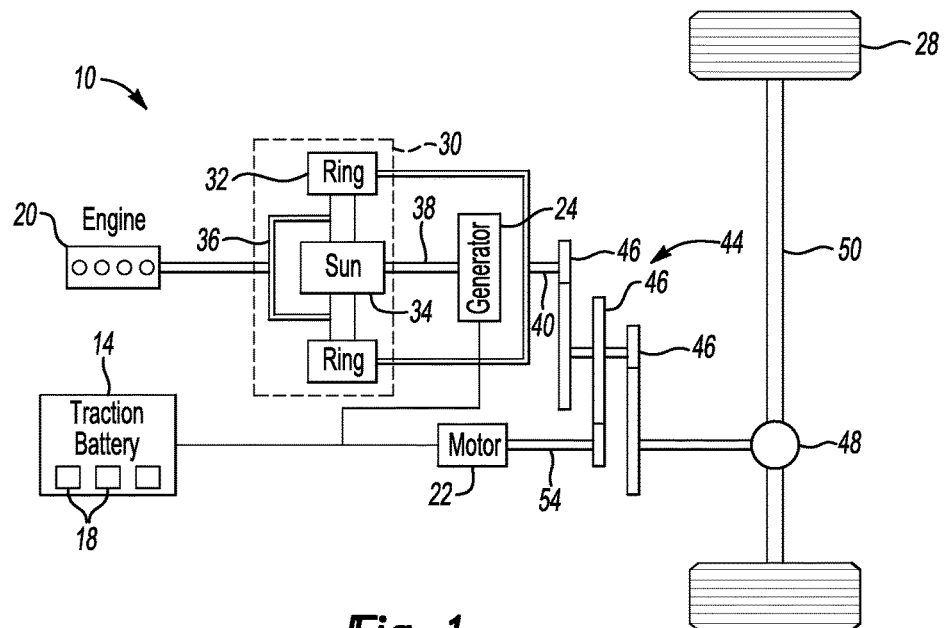
FIG. 1 illustrates a schematic view of a powertrain of an electrified vehicle.

Referring to FIG. 1, a powertrain 10 of a plug-in hybrid electric vehicle (PHEV) includes a traction battery 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

Although depicted as a PHEV, it should be understood that the concepts described herein are not limited to PHEVs and could extend to traction batteries in any other type of electrified vehicle, including, but not limited to, other hybrid electric vehicles (HEVs), battery electric vehicles (BEVs), fuel cell vehicles, etc.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery 14.

Figure 2:
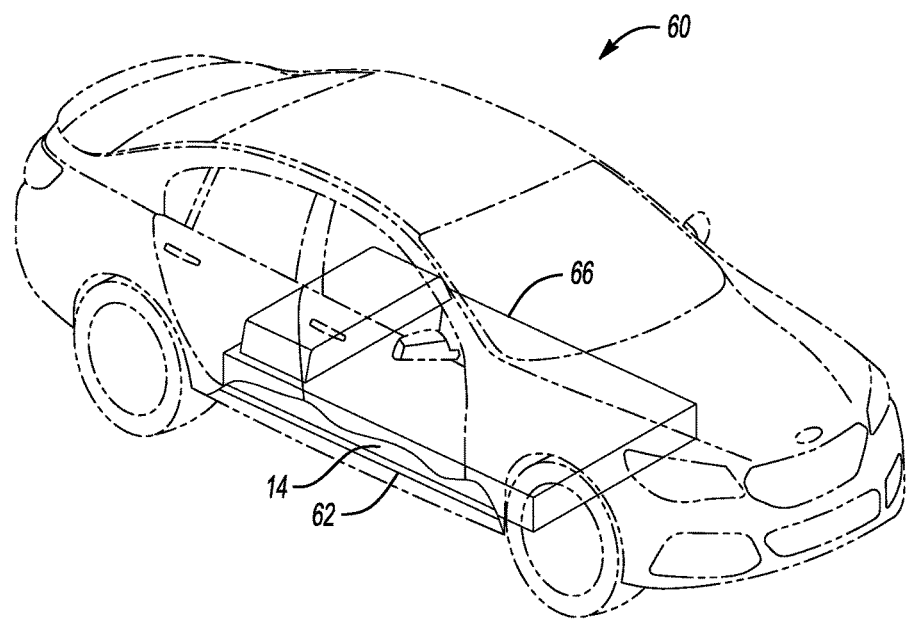
FIG. 2 illustrates a perspective view of an electrified vehicle incorporating the powertrain of FIG. 1.
Figure 3:
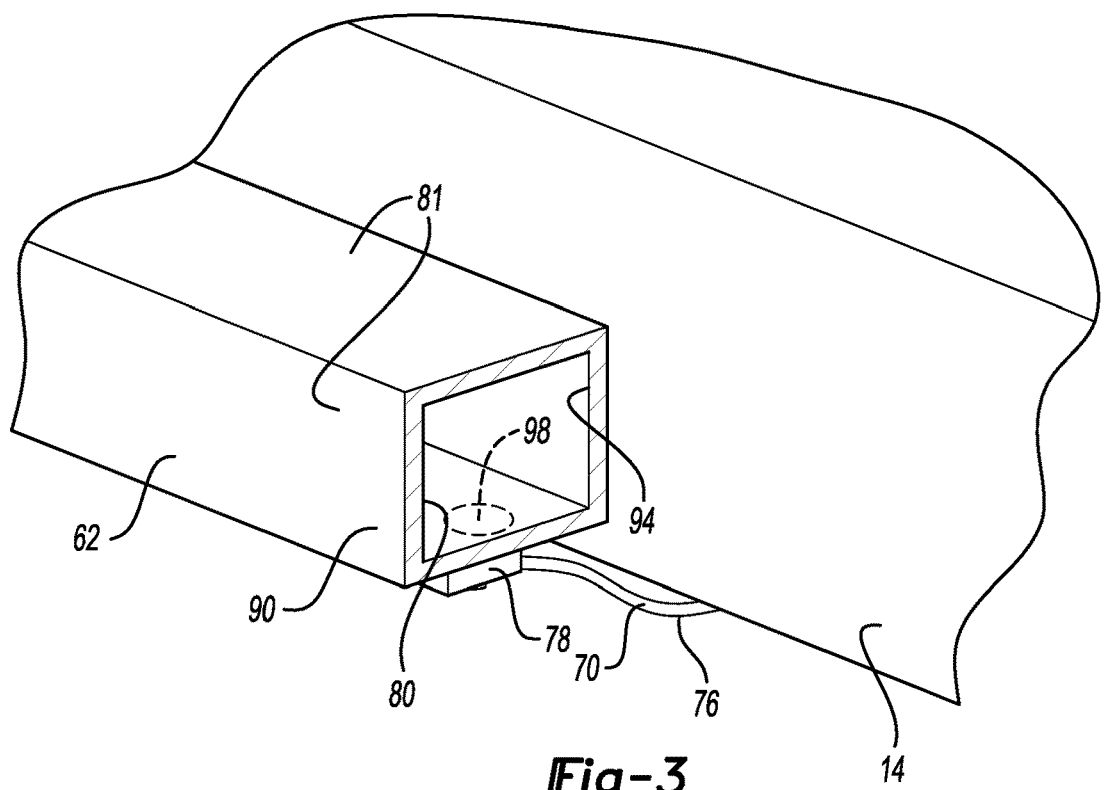
FIG. 3 illustrates a close-up partially section view of a grounding block that grounds a traction battery of the powertrain to a frame rail of the vehicle.
Figure 4A:
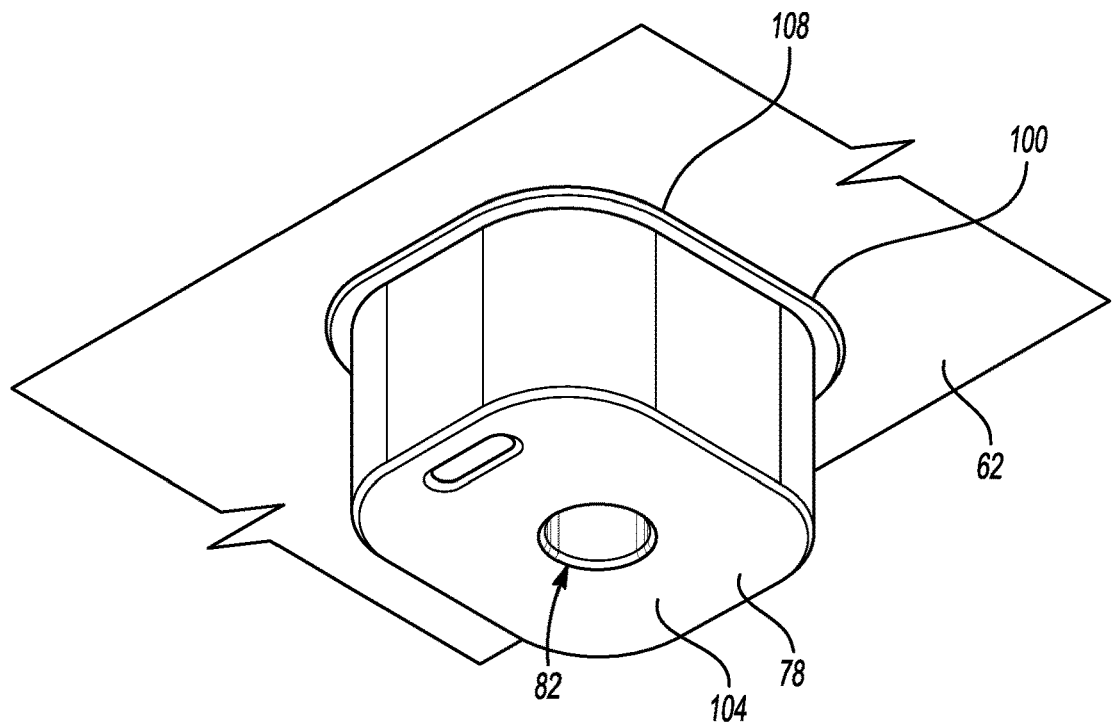
FIG. 4A illustrates a perspective view of the grounding block of FIG. 3.
Figure 4B:
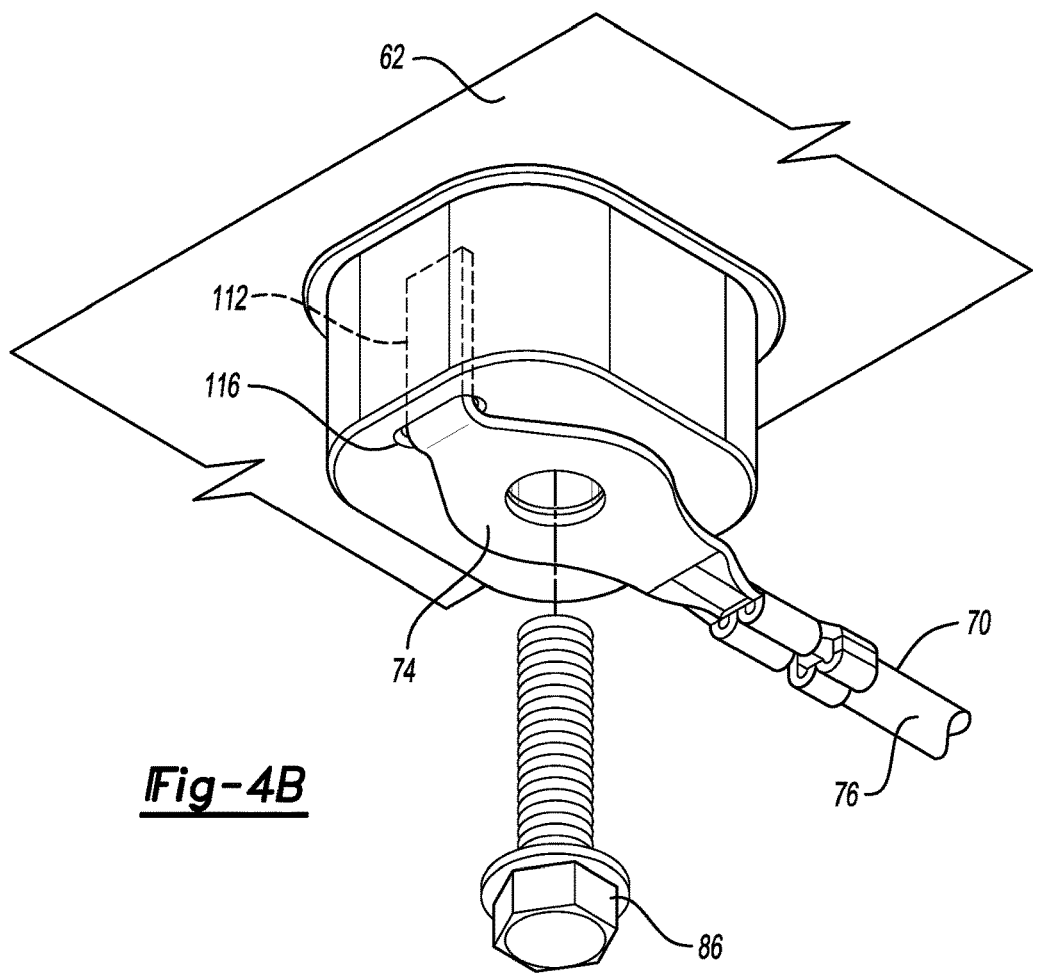
FIG. 4B illustrates a perspective view of a grounding strap being secured to the grounding block of FIG. 4A.
Figure 4C:
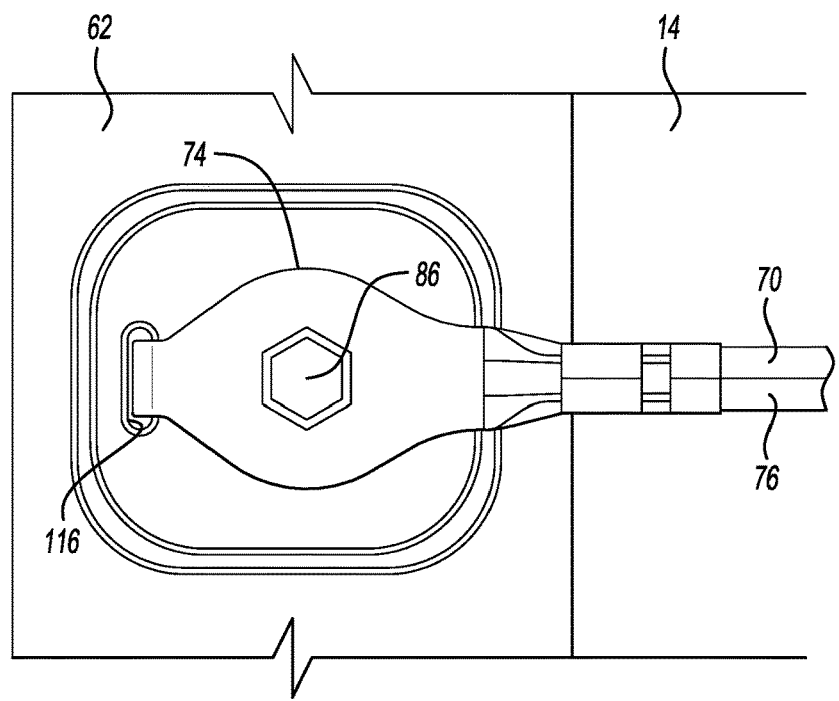
FIG. 4C illustrates a bottom view of the grounding strap secured to the grounding block of FIG. 4A.

With reference now to FIG. 2, an electrified vehicle 60 can include the powertrain 10 of FIG. 1. In the exemplary vehicle 60, the traction battery 14 of the powertrain 10 is positioned adjacent an underbody of the vehicle 60 between a passenger side frame rail 62 and a driver side frame rail 66. The frame rails 62, 66 are frame members of a chassis of the electrified vehicle 60. The frame rails 62, 66 extend along a longitudinal axis of the electrified vehicle 60. The frame rails 62, 66 extend longitudinally from the rear of the vehicle 60 to a front end of the vehicle 60. Other frame members can include cross members that extend in a cross-vehicle direction. The rails 62, 66 are metal or metal alloy material.

The traction battery 14 is supported by, and directly connected to, the frame rails 62 and 66 to help secure the traction battery 14 within the electrified vehicle 60.

With reference now to FIGS. 3 and 4A-4C, the example traction battery 14 is electrically grounded to the frame rail 62 through a grounding strap 70. In this example, a grounding strap connector 74 of the grounding strap 70 is secured directly to a grounding block 78, which is secured directly to the passenger side frame rail 62. The grounding block 78 is welded to the frame rail 62 in this example. Other examples may connect the grounding block 78 to the frame rail 62 in other ways.

The grounding strap connector 74 is a grounding strap eyelet in this example. A grounding cable 76 extends from the grounding strap connector 74 to an area within the traction battery 14 and is electrically coupled to components of the traction battery 14.

The frame rail 62 has a hollow, box-style cross section. The frame rail 62 includes at least one internal surface 80 that faces the hollow cross section, and at least one external surface 81 that faces away from the hollow cross-section. In the exemplary embodiment, the grounding block 78 is secured to one of the external surfaces 81 of the frame rail 62.

The grounding block 78 includes a bore 82 configured to receive a fastener 86. Prior to receiving the fastener 86, the example bore 82 is an unthreaded bore. The example fastener 86 is a thread cutting fastener that cuts threads into the grounding block 78 and the bore 82 when torqued down to secure the grounding strap connector 74.

The grounding block 78 is secured to an unapertured area 98 of the frame rail 62 such that, when secured to the frame rail 62, the grounding block 78 spans no aperture within the frame rail 62. The unapertured area 98 can be located near a radius on the frame rail 62. If an aperture in the frame rail 62 were required, the fastener 86 would not be able to locate that closely to the radius as punching or extruding holes in the frame rail 62 near a radius may be cost prohibitive or overly complex. Further, because the grounding block 78 is secured to the unapertured area 98, the frame rail 62 can be a carryover component without requiring the addition of a specialized aperture to accommodate the fastener 86. When the fastener 86 is securing the grounding strap connector 74, the grounding strap connector 74 is held directly against the grounding block 78 by the fastener 86.

The grounding block 78 extends from a first side 100 to an opposite, second side 104. The grounding strap connector 74 is placed directly against the second side 104. An area of the first side 100 is greater than an area of the second side 104. The difference in area is due to the flange 108, which protrudes radially from an end of the grounding block 78 near the first side 100 to provide the grounding block 78 with a radially enlarged portion. Radial is with reference to an axis of the bore 82.

The radially enlarged portion provides additional material, which facilitates welding the grounding block 78 directly to the passenger side frame rail 62. The fastener 86 when received within the bore 82 to engage the grounding block 78 holds the grounding strap connector 74 directly in contact with the grounding block 78.

The grounding strap connector 74 includes a tang 112 that is received within an aperture 116 of the grounding block 78 when the grounding strap connector 74 is secured to the grounding block 78 by the fastener 86. The tang 112 and the aperture 116 together provide a locating system configured to locate the grounding strap 70 circumferentially about a longitudinal axis of the bore 82 relative to the grounding block 78.

Placing the tang 112 within the aperture 116 when securing the grounding strap connector 74 to the grounding block 78 ensures a circumferential positioning of the grounding strap connector 74. Knowing the positioning of the grounding strap connector 74 can be important to ensure that portions of the grounding strap connector 74 and the grounding strap 70 are in desired areas, such as the cable 76 being directed back toward the traction battery 14.

Figure 5A:
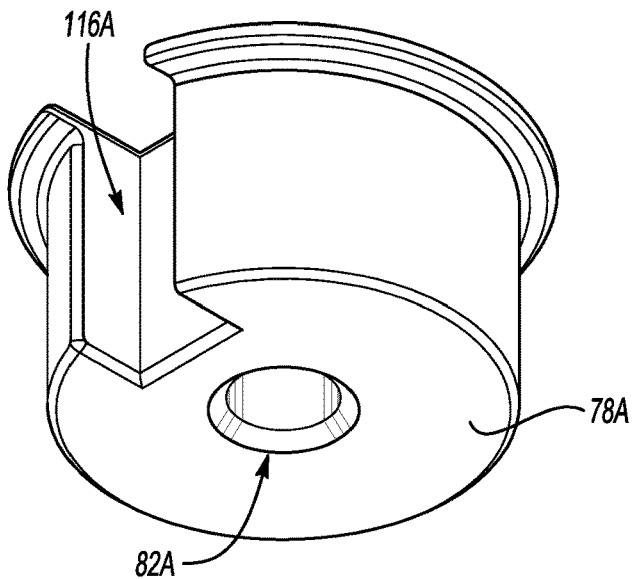
FIG. 5A illustrates a perspective view of a grounding block according to another exemplary aspect of the present disclosure.
Figure 5B:
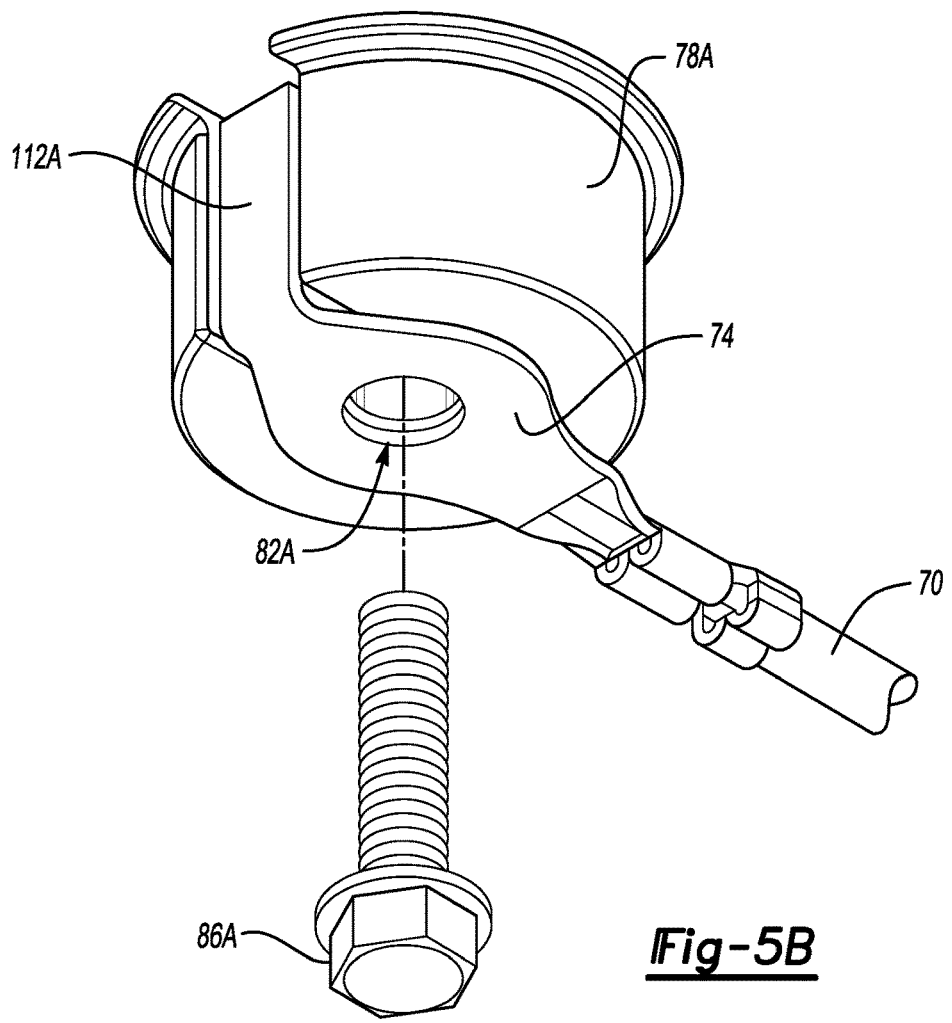
FIG. 5B illustrates a grounding strap being secured to the grounding block of FIG. 5A.
Figure 5C:
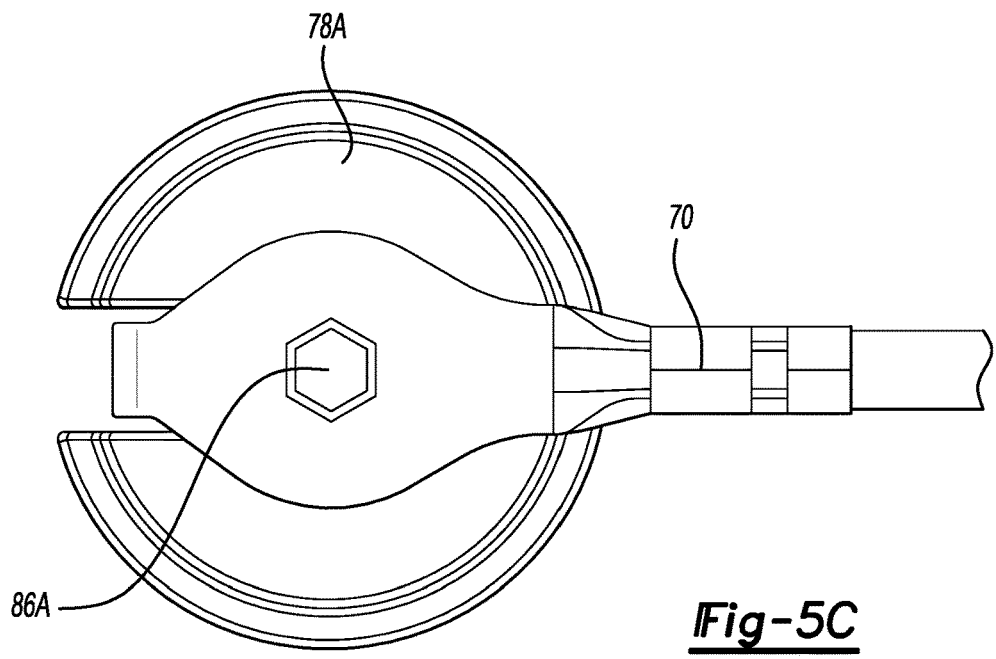
FIG. 5C illustrates a bottom view of the grounding strap of FIG. 5B secured to the grounding block.
Figure 6A:
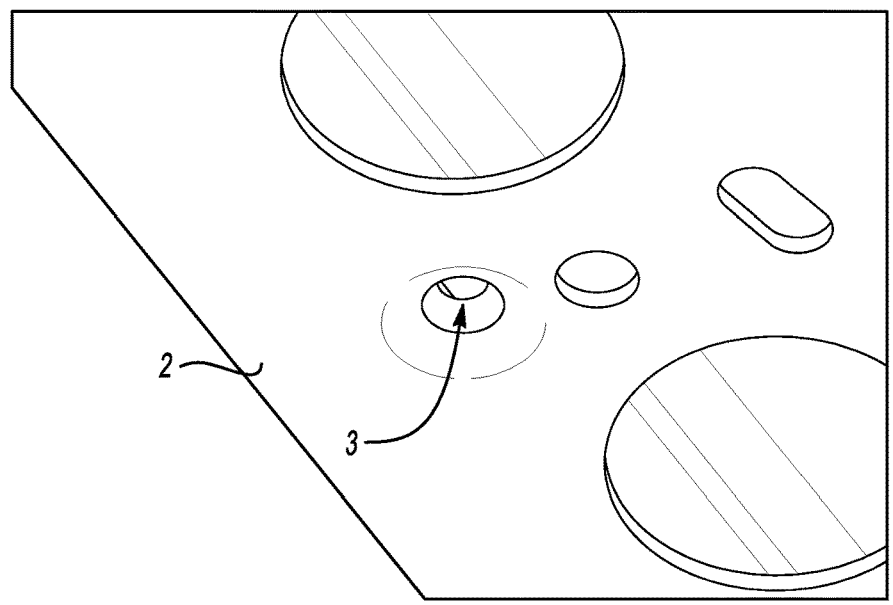
FIG. 6A illustrates a portion of a prior art vehicle frame member.
Figure 6B:
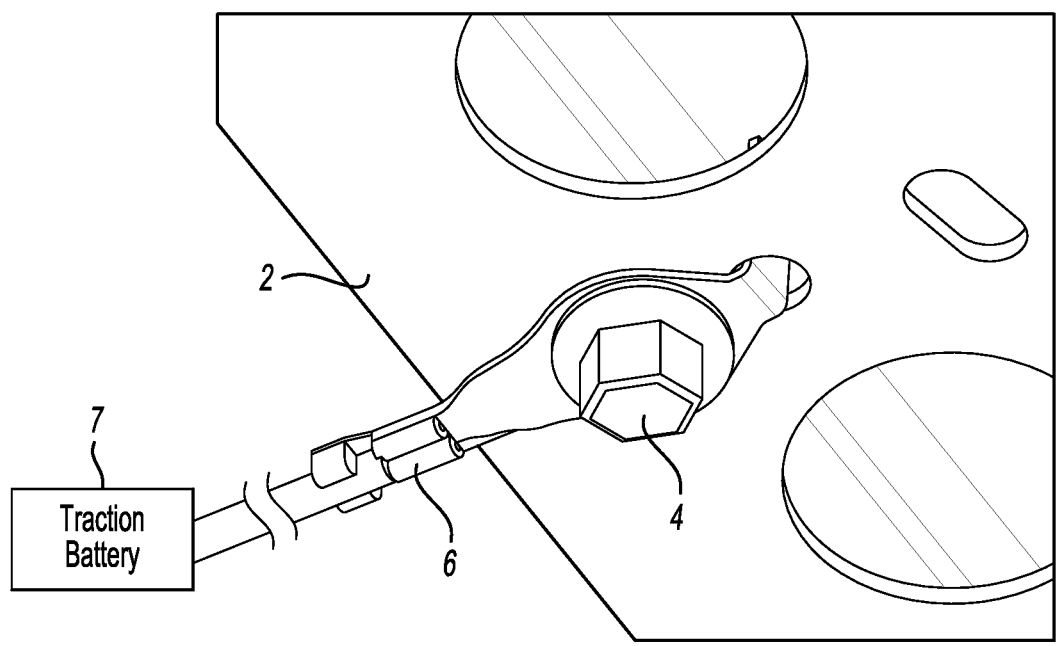
FIG. 6B illustrates a prior art grounding strap secured to the vehicle frame member of FIG. 6A.

With reference now to FIGS. 5A-5C, a grounding block 78A according to another exemplary aspect of the present disclosure is shown. The grounding block 78A has a circular profile. A bore 82A is provided within the grounding block 78A to receive mechanical fastener 86A. The grounding block 78A further includes an aperture 116A providing a portion of the locating system that receives a tang 112A of the grounding strap connector 74A to help locate the grounding strap 70 relative to the grounding block 78A. The aperture 116A is, in contrast to the aperture 116 of the grounding block 78, open to a side of the grounding block 78A that is perpendicular to an axis of the bore 82A.

Using the grounding block 78, 78A permits greater thread engagement than prior art designs. Mounting the grounding block on an external surface avoids assembly issues associated with securing a weld nut, for example, to an internal surface.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An electrified vehicle assembly, comprising:
   a grounding block secured to a frame member of an electrified vehicle, the grounding block including a bore configured to receive a fastener to hold a grounding strap connector relative to the grounding block, wherein the grounding block is secured to an unapertured area of the frame member such that the grounding block spans over no aperture within the frame member, wherein the frame member has a hollow cross-section, at least one internal surface that faces the hollow cross section, and at least one external surface that faces away from the hollow cross-section, wherein the grounding block is secured to an external surface of the frame member; and
   a locating system that locates the grounding strap connector relative to the grounding block.

2. The electrified vehicle assembly of claim 1, wherein the bore is unthreaded prior to receiving the fastener, wherein the fastener is a thread-cutting fastener.

3. The electrified vehicle assembly of claim 1, further comprising the grounding strap connector and the fastener, the grounding strap connector held directly against the grounding block by the fastener.

4. The electrified vehicle assembly of claim 1, wherein the bore is disposed along an axis, wherein the locating system is configured to locate the grounding strap connector circumferentially about the axis relative to the grounding block.

5. The electrified vehicle assembly of claim 1, wherein the bore is disposed along an axis, wherein the locating system includes an aperture that receives a tang, the tang at least partially received within the aperture to limit circumferential movement of the grounding strap connector relative to the grounding block.

6. The electrified vehicle assembly of claim 5, wherein the aperture is provided within the grounding block, wherein the tang is part of the grounding strap connector.

7. The electrified vehicle assembly of claim 3, wherein the grounding block extends from a first side that contacts the vehicle frame to an opposite second side that is placed against the grounding strap connector, wherein an area of the first side is greater than an area of the second side.

8. The electrified vehicle assembly of claim 3, further comprising a radially extending flange of the grounding block, the radially extending flange near the vehicle frame, wherein radially is with reference to a longitudinal axis of the bore.

9. The electrified vehicle assembly of claim 1, wherein the grounding strap connector is configured to provide a ground path to the vehicle frame, the ground path grounding a traction battery to the vehicle frame.

10. The electrified vehicle assembly of claim 1, wherein the fastener holds the grounding strap connector in direct contact with the grounding block.

11. A traction battery grounding method, comprising:
    securing a grounding block to a frame member of an electrified vehicle, the grounding block secured to an unapertured area of the frame member such that the grounding block spans over no aperture within the frame member;
    receiving a fastener within a bore of the grounding block, the fastener holding a grounding strap connector relative to the grounding block; and
    cutting threads within the grounding block when positioning the fastener within the bore.

12. The method of claim 11, further comprising circumferentially locating the grounding strap connector relative to the grounding block during the securing.

13. The method of claim 12, further comprising receiving a tang within an aperture as part of a locating system during the locating.

14. The method of claim 13, wherein the locating system circumferentially locates the grounding strap connector relative to the grounding block, wherein circumferential is with reference to an axis of the bore within the grounding block.

* * * * *